US00RE51008E

(19) United States
(12) Reissued Patent
Nord et al.

(10) Patent Number: US RE51,008 E
(45) Date of Reissued Patent: *Aug. 18, 2026

(54) USER EQUIPMENT, NETWORK NODE AND RADIO COMMUNICATION METHOD

(71) Applicant: Sony Group Corporation, Tokyo (JP)

(72) Inventors: Lars Nord, Lund (SE); Anders Berggren, Lund (SE)

(73) Assignee: Sony Group Corporation, Tokyo (JP)

( * ) Notice: This patent is subject to a terminal disclaimer.

(21) Appl. No.: 18/912,045

(22) Filed: Oct. 10, 2024

Related U.S. Patent Documents

Reissue of:
(64) Patent No.: 11,516,771
Issued: Nov. 29, 2022
Appl. No.: 17/116,657
Filed: Dec. 9, 2020

U.S. Applications:
(63) Continuation of application No. 15/771,758, filed as application No. PCT/EP2016/077083 on Nov. 9, 2016, now Pat. No. 10,893,503.

(30) Foreign Application Priority Data

Nov. 12, 2015 (EP) ..... 15194255

(51) Int. Cl.
*H04W 68/02* (2009.01)
*H04W 68/00* (2009.01)

(52) U.S. Cl.
CPC ..... *H04W 68/02* (2013.01); *H04W 68/00* (2013.01); *Y02D 30/70* (2020.08)

(58) Field of Classification Search
CPC ..... H04W 68/00; H04W 68/02; Y02D 30/70
See application file for complete search history.

(56) References Cited

U.S. PATENT DOCUMENTS

| | | | | |
|---|---|---|---|---|
| 2011/0201343 | A1 | 8/2011 | Pinheiro et al. | |
| 2012/0044910 | A1 | 2/2012 | Maeda et al. | |
| 2015/0103721 | A1 | 4/2015 | Yi et al. | |
| 2015/0327215 | A1 | 11/2015 | Xu | |
| 2016/0088515 | A1 | 3/2016 | Griot et al. | |
| 2016/0205659 | A1* | 7/2016 | Bergman | H04L 1/1812 370/252 |
| 2016/0227514 | A1 | 8/2016 | Burbidge et al. | |
| 2016/0270027 | A1 | 9/2016 | Ang et al. | |

(Continued)

FOREIGN PATENT DOCUMENTS

| | | | |
|---|---|---|---|
| JP | 2004241868 | A | 8/2004 |
| JP | 2013520102 | A | 5/2013 |

(Continued)

OTHER PUBLICATIONS

International Search Report and Written Opinion from counterpart International Patent Application No. PCT/EP2016/077083, mailed Mar. 24, 2017.

(Continued)

*Primary Examiner* — Matthew E Heneghan
(74) *Attorney, Agent, or Firm* — Tucker Ellis LLP

(57) ABSTRACT

A signalling message including paging related information indicative of whether a user equipment (UE) is pageable or indicative of whether the UE will be paged is transmitted. The UE does not listen on a paging channel if the pageability information indicates that the UE is unpageable.

19 Claims, 8 Drawing Sheets

(56) References Cited

U.S. PATENT DOCUMENTS

| | | | |
|---|---|---|---|
| 2017/0086165 | A1 | 3/2017 | Tarradell et al. |
| 2017/0230935 | A1 | 8/2017 | Xu et al. |
| 2018/0263015 | A1 | 9/2018 | Burbidge et al. |

FOREIGN PATENT DOCUMENTS

| | | | |
|---|---|---|---|
| JP | 2014143736 | A | 8/2014 |
| WO | 2009022367 | A1 | 11/2010 |
| WO | 2015083063 | A2 | 6/2015 |

OTHER PUBLICATIONS

Intel Corporation, "Paging impacts due to introduction of NB-IOT feature", 3GPP TSG RAN WG2 Meeting #92, Anaheim, USA, Nov. 2015, 7 pages.

* cited by examiner

USER EQUIPMENT, NETWORK NODE AND RADIO COMMUNICATION METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This continuation application claims priority to and the benefit of U.S. application Ser. No. 15/771,758 filed on Apr. 27, 2018. U.S. application Ser. No. 15/771,758 is a national phase application of International Application No. PCT/EP2016/077083 filed Nov. 9, 2016 and published in the English language. International Application No. PCT/EP2016/077083 claims priority to European Application No. EP15194255.4 filed on Nov. 12, 2015. The entireties of the aforementioned applications are incorporated herein by reference.

TECHNICAL FIELD

Embodiments of the invention relate to wireless communication. Embodiments of the invention relate in particular to a signalling between a user equipment and a radio access network node that determines whether the user equipment will listen for paging signals.

BACKGROUND

With increasing popularity of mobile data communication, an ever increasing number of devices is equipped with a radio interface for communication with a cellular communication network. Sensors and wearable devices are examples for devices that may be operative for communication with a cellular network.

While some kinds of user equipments are expected to provide high data rates, such as smartphones or portable computers, battery lifetime is of significant importance for other types of user equipments that may not require high data rates. Sensors, wearable devices, or other units that infrequently transmit small amounts of data and which may accommodate long downlink latencies are examples of devices for which long battery lifetime is particularly relevant. Further, in view of the ever increasing number of user equipments that is deployed for communication with a cellular network radio resource usage becomes a relevant issue. Techniques that may assist reducing radio access network loads become increasingly important.

With massive deployment of user equipments such as sensors or other devices that may accommodate high latency in downlink data transmissions, listening for paging signals may be a significant source of energy consumption of the user equipment. Discontinuous reception, DRX, schemes which include periods where the user equipment does not need to monitor system information or receive page signals and which include periods in which the user equipment wakes up to listen for potential pages intended to the user equipment may reduce power consumption. However, the periods in which the user equipment wakes up to listen for pages may reduce battery lifetime, and the paging of user equipments that do not need to receive pages may add to radio access network loads.

SUMMARY

There is a continued need in the art for devices, systems and methods which mitigate at least some of the above shortcomings. There is a need for devices, systems and methods that allow user equipment battery lifetime to be extended and/or that allow radio access network loads to be reduced.

According to embodiments, a signalling for a paging configuration is provided. In some embodiments, a user equipment (UE) may inform a cellular network that the UE is unpageable. The UE may include paging related information indicating that the UE is unpageable into a UE capability signalling message. The paging related information indicating that the UE is unpageable may consist of one or several indicator bits that specifically indicate that the UE is unpageable or that the UE is pageable. The information indicating that the UE is unpageable may also be included in the UE category in the UE capability signalling message that indicates the UE class. The cellular network may understand from the UE category that is signalled by the UE that the UE is unpageable.

Alternatively or additionally, the cellular network may inform a UE that the UE will not be paged by the cellular network. For illustration, in massive deployment of UEs that operate in extended coverage (EC) mode, the cellular network may inform UEs, depending on UE class or UE category, that certain UEs will not receive pages.

If the UE is unpageable or the cellular network informs the UE that the UE will not receive pages, the UE will refrain from listening on the paging channel. Further, the cellular network may refrain from paging the respective user equipment. Battery lifetime of the UE is prolonged and radio access network loads are reduced.

A user equipment according to an embodiment comprises a radio interface operative to transmit or receive a signalling message including paging related information that is indicative of whether the user equipment, UE, is pageable or that is indicative of whether the UE will be paged. The UE comprises an electronic circuit operative to control the radio interface in dependence on the paging related information.

A UE having such a configuration may be operative to not listen for pages at all, if the UE has indicated to the cellular network that the UE is unpageable or if the cellular network has indicated that the cellular network will not page the UE. Battery lifetime of the UE may thereby be prolonged. Further, the load, in the radio access network, may also be reduced.

The radio interface may be operative to transmit at least one UE capability signalling message that includes the paging related information indicating that the UE is unpageable or that the UE is pageable. This allows the UE to inform the cellular network that the UE is unpageable.

The at least one UE capability signalling message may include both a UE category indicator and at least one pageability indicator bit that indicates whether the user equipment is pageable, the at least one pageability indicator bit being an information element different from the UE category indicator. This allows the UE to inform the cellular network that the UE is unpageable using information elements that are independent of the UE category. Different UEs in the same UE category may be selectively defined to be pageable or unpageable.

A UE category indicator included in the at least one UE capability signalling message may be indicative of whether the UE is pageable. This allows the UE to inform the cellular network of the fact that the UE is unpageable using the UE category indicator that must anyway be included in a UE capability signalling message.

The UE category indicator may indicate that the UE is included in a class of unpageable Narrow Band Internet of Things, NB-IoT, devices.

Irrespective of how the UE informs the cellular network of the fact that the UE is unpageable, the unpageable UE may be a UE operating in extended coverage (EC) mode or an unpageable NB-IoT device.

The UE may be configurable by a cellular network so as to be unpageable. This affords network control over whether UEs will listen for pages. The cellular network may selectively cause UEs to refrain from listening for pages, for example if the number of UEs of a certain UE class or the overall number of UEs in a cell exceeds a threshold.

The UE may be operative to receive a signalling message from the cellular network which causes the UE to refrain from listening for paging signals.

The electronic circuit may be operative to control the radio interface such that the UE does not listen on a paging channel if the paging related information indicates that the UE is unpageable or if the paging related information indicates that the UE will not be paged. Battery lifetime of the UE may thereby be prolonged.

The UE that is unpageable or that will not be paged by the cellular network may be a UE operating in extended coverage (EC) mode.

The UE that is unpageable or that will not be paged by the cellular network may be a UE insensitive to high latency on downlink data traffic. A machine type communication (MTC) device is exemplary for such a device.

The UE that is unpageable or that will not be paged by the cellular network may be a Narrow Band Internet of Things (NB-IoT) device.

The UE that is unpageable may be operative to receive downlink user data after the UE initiates mobile originated, MO, traffic or conducts a tracking area update (TAU) procedure. This allows the cellular network node to piggyback on a TAU response, for example, in downlink data transmission.

The UE that is unpageable may be a sensor or a wearable device.

A network node according to an embodiment comprises an interface operative to receive or transmit a signalling message including paging related information that is indicative of whether the user equipment, UE, is pageable or that is indicative of whether the UE will be paged. The network node comprises a processing device operative to control transmission of pages to the UE in dependence on the pageability information.

A network node having such a configuration may be operative to not page a UE, if paging related information received from the UE indicates that the UE is unpageable or if paging related information transmitted by the network node to the UE indicates that the network will not page the UE. Radio access network loads may be reduced.

The processing device of the network node may be operative to process a UE capability signalling message. The UE capability signalling message may include the paging related information that is indicative of whether the UE is pageable.

The processing device of the network node may be operative to determine from at least one pageability indicator bit that is included in the UE capability signalling message that the UE is unpageable.

The processing device of the network node may be operative to determine from a UE category indicator that is included in the UE capability signalling message that the UE is unpageable.

The processing device of the network node may be operative to inform the UE that the UE will not be paged. The processing device of the network node may evaluate any one or any combination of criteria to determine whether the UE is to be paged. For illustration, radio access network loads may be monitored to determine whether the UE is to be paged. Alternatively or additionally, latencies in downlink data transmissions to the UE may be evaluated by the network node to determine whether the UE needs to be paged.

The processing device may be operative to delay a downlink data transmission for a UE that is unpageable until after the UE initiates mobile originated (MO) traffic or conducts a tracking area update (TAU) procedure.

The processing device may be operative to delay a downlink data transmission for a UE that is not paged by the cellular network until after the UE initiates MO traffic or conducts a TAU procedure.

The network node may be a radio access network node. The radio access network node may be an eNodeB. The radio access network node may be a node of a NB-IoT radio access network.

The network node may be a core network node. The core network node may be a MME or SGSN.

A system according to an embodiment comprises the user equipment according to an embodiment and the network node according to an embodiment.

A method of conducting radio communication between a user equipment and a cellular network comprises transmitting a signalling message including paging related information that is indicative of whether the user equipment, UE, is pageable or that is indicative of whether the UE will be paged. The UE does not listen on a paging channel if the pageability information indicates that the UE is unpageable.

Transmitting the signalling message including paging related information may comprise signalling, by the UE, that the UE is unpageable. A non access stratum (NAS) message may be transmitted from the UE to the MME or another core network node to indicate that the UE is unpageable.

Transmitting the signalling message including paging related information may comprise transmitting, by a radio access network of the cellular network, a signalling message indicating that the cellular network will not page the respective UE. The signalling message transmitted by the radio access network may be a TAU response, an attach response, or system information that is broadcast.

The method may comprise refraining, by the UE, from listening on a paging channel if the signalling message indicates that the UE is unpageable or that the cellular network will not page the UE.

The method may comprise refraining, by the cellular network, from paging the UE if the signalling message indicates that the UE is unpageable or that the cellular network will not page the UE.

When the UE is an unpageable NB-IoT device, the radio access network may refrain from paging the UE.

When the UE operates in extended coverage (EC) mode, a radio access network node may determine whether a paging attempt is to be made. If a paging attempt is to be made, only one paging attempt may be made. If the one paging attempt fails, the radio access network node may wait for the UE to initiate MO traffic or to perform a TAU procedure. If no paging attempt is to be made, the radio access network node may wait for the UE to initiate MO traffic or to perform a TAU procedure before a downlink data transmission is performed.

In any one of the embodiments, the paging related information may be paging to configuration information that specifies a paging configuration. The paging configuration may define whether a UE is pageable as normal, unpageable, i.e. unable to receive pages, or able to receive pages, but not listening for pages because the network will not send any page for to this device.

The paging configuration may be defined by the paging related information that is signaled between the UE and the network. The paging configuration may be transmitted from the UE to the network in capability signalling or may be transmitted from the network to the UE when the network informs the UE that it will not page the UE.

Further features of the method according to embodiments and the effects respectively attained thereby correspond to the features and effects described in the context of devices and systems according to embodiments.

Devices, systems and methods according to embodiments allow a UE to refrain from listening for pages and further allow a base station to suppress any transmission of pages to the respective UE.

While some embodiments have been described in the context of machine-type communication (MTC) and NB-IoT devices, the techniques disclosed herein may also be employed for other devices and radio access network techniques.

BRIEF DESCRIPTION OF THE DRAWINGS

Embodiments of the invention will be described with reference to the accompanying drawings in which the same or similar reference numerals designate the same or similar elements.

DETAILED DESCRIPTION OF EMBODIMENTS

Exemplary embodiments of the invention will be described with reference to the drawings. While some embodiments will be described in the context of specific fields of application, e.g. in the context of certain communication techniques, the embodiments are not limited to this field of application. The features of the various embodiments may be combined with each other unless specifically stated otherwise.

Figure 1:
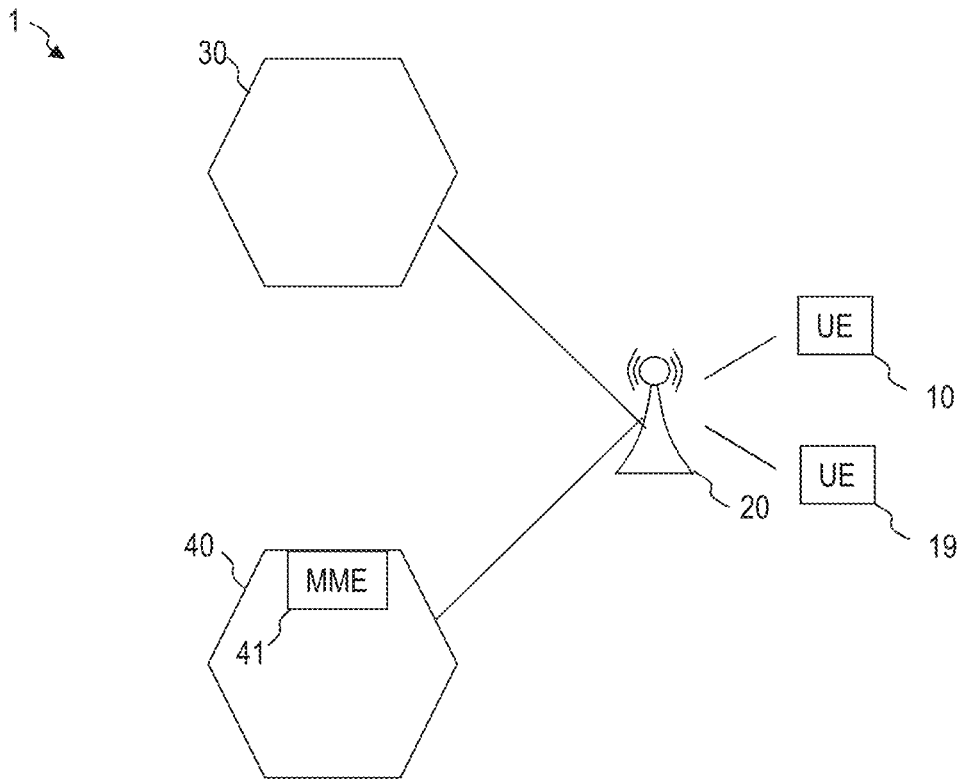
FIG. 1 is a schematic view of a communication system according to an embodiment.

FIG. 1 is a schematic view of a communication system 1 according to an embodiment.

The communication system 1 comprises a cellular network and user equipments (UEs) 10, 19. Different UEs may be operative for communication with different cellular networks. For illustration, a base station 20 may be connected to both a first core network 30 and a second core network 40 having a cellular network node 41. The first core network 30 may be a legacy LTE core network. The UE 19 may be operative for communication with the first core network 30 over the base station 20. The second core network 40 may be a Cellular Internet of Things (CIoT) core network. The UE 10 may be operative for communication with the second core network 40 over the base station 20. The UE 10 may be operative such that it is incapable of communicating with the first core network 30.

The UE 19 may have a radio interface for communication over an evolved Machine Type Communication (eMTC) radio access network (RAN). The UE 19 may have a wireless interface for communication over an MTC RAN as described in 3GPP TR 36.888 V12.0.0 (Rel-12) and eMTC for Rel-13.

The UE 10 may have a radio interface for communication over a Narrow Band Internet of Things (NB-IoT) RAN. The UE 10 may have a radio interface for communication with a CIoT network as described in 3GPP TR 45.820 and 3GPP TR 23.720. The UE 10 may have a radio interface for communication with a CIoT network as described in 3GPP TR 45.820 V13.0.0 (Rel-13) and 3GPP TR 23.720 V1.0.0 (Rel-13).

As will be described in more detail below, the UE 10 and/or the UE 19 may be operative such that they are unpageable. For illustration, the UE 10 may belong to a category of unpageable NB-IoT devices. The UE 19 may operate in extended coverage mode in which it may be unpageable or in which its pageability may be restricted.

The UE 10 or the UE 19 may respectively transmit information indicating that the UE is unpageable to the base station 20 or the core network 40, 30. Alternatively or additionally, the base station 20 or the core network 40, 30 may be operative to configure the UE 10 or the UE 19 to be unpageable or may inform the UE that the cellular network will not page the respective UE. If a UE is unpageable or if the cellular network will not page the respective UE, the UE will refrain from listening for pages. There is no need for the UE to wake up to listen on a paging channel. There is no need for the network to transmit pages to the UE. In order to transmit downlink data, an MME, the base station 20 or other cellular network nodes may wait until after the UE has initiated a TAU procedure or has initiated MO traffic.

While embodiments described in detail hereinbelow will be presented in the context of a base station that receives or transmits paging related information and/or that refrains from paging the UE 10, 19 under certain conditions, it will be appreciated that the paging may be done by other network nodes. For illustration, an MME may determine, based on a NAS signalling message received from the UE 10, 19, that the UE 10, 19 is unpageable. The MME may refrain from paging the UE 10, 19. Similarly, other core network nodes or radio access network nodes may perform the processes that will be described in more detail below in the exemplary context of the base station 20.

The UE 10, 19 and the cellular network may be operative such that paging is reduced compared to legacy discontinuous reception (DRX) schemes when the UE 10, 19 is unpageable or when the cellular network informs the UE 10, 19 that it will not be paged. The UE 10, 19 and cellular network may be operative such that paging is reduced compared to legacy extended DRX (eDRX) schemes when the UE 10, 19 is unpageable or when the cellular network informs the UE 10, 19 that it will not be paged. When the UE 10, 19 is unpageable or when the cellular network informs the UE 10, 19 that the cellular network will not page the UE 10, 19, the UE 10, 19 may refrain from ever listening for paging signals.

A decision that the cellular network will not page the UE 10, 19 may be made based on operating mode. For illustration, the UE 10, 19 may be unpageable in EC mode in which transmissions are repeated many times. Paging of the UE 10, 19 may be restricted to a single paging attempt in EC mode.

Alternatively or additionally, a decision that the cellular network will not page the UE 10, 19 may be made based on UE type. For illustration, the UE 10 may be unpageable when it is included in a category of unpageable NB-IoT devices.

Paging restrictions may accordingly be implemented in case of EC operation or in case a UE is a NB-IoT device. Various implementations which preclude the UE from being paged or which reduce paging compared to eDRX schemes will be described in more detail with reference to FIG. 2 to FIG. 14 below.

Figure 2:
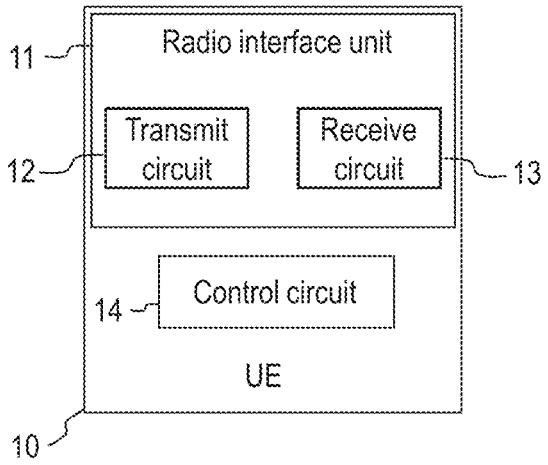
FIG. 2 is a block diagram of a user equipment according to an embodiment.

FIG. 2 is a block diagram of a UE 10 according to an embodiment. The UE 10 may be a sensor or a wearable device.

The UE 10 has a radio interface unit 11 which may include a transmit circuit 12 and a receive circuit 13. The radio interface unit 11 may be configured to transmit and receive signals to and from a cellular network which may be a CIoT 40 over a NB-IoT RAN. The radio interface unit 11 may be configured to transmit and receive signals to and from a cellular network which may be a legacy LTE cellular network 30 over an evolved Machine-Type-Communication (eMTC) RAN.

Operation of the radio interface unit 11 may be adjustable under the control of a control circuit 14. The control circuit 14 may include one or several processors, controllers, application specific integrated circuits (ASICs), other integrated circuits or combinations of such devices.

The control circuit 14 may be configured to control the radio interface unit 11 to transmit a signalling message to the cellular network which indicates that the UE 10 is unpageable. The control circuit 14 may be configured to control the radio interface unit 11 such that it refrains from listening for pages to the UE 10 when the signalling message transmitted by the UE 10 to the cellular network indicates that the UE 10 is unpageable.

The control circuit 14 may be operative to include the paging related information in an attach request or other message. For illustration, the paging related information could use a MS classmark 3 in the attach request message. The information element may be included in a NAS message between the UE 10 and the MME.

Alternatively or additionally, the control circuit 14 may evaluate a signalling message received at the radio interface unit 11 from the base station 20. The signalling message may indicate that the UE 10 will not be paged by the cellular network. In response to receipt of such a signalling message, the control circuit 14 may be configured to control the radio interface unit 11 such that it refrains from listening for pages to the UE 10 when the signalling message transmitted to the UE 10 by the cellular network indicates that the UE 10 will not be paged. The cellular network may control one or several UEs such that those UEs will stop listening for pages. This may be done selectively in massive deployment scenarios where a large number of sensors are deployed within a cell or in dependence on radio access network loads.

The UE 10 may indicate to the cellular network that it is unpageable if it belongs to a category of unpageable NB-IoT devices. By transmission of a signalling message which includes information on that the UE is unpageable, the cellular network may be informed that downlink transmission is to the UE 10 will have to be postponed until the UE 10 initiates MO traffic or performs a TAU procedure, for example.

Information on that the UE is unpageable may be included in UE capability signalling messages. To this end, UE capability signalling messages as defined in 3GPP TS 36.306 V 12.6.0 (Rel-12) or 3GPP TS 24.008 V 13.3.0 (Rel-13) may be modified to include information that indicates that the UE is unpageable. This information may be encoded in various ways. For illustration, a UE category indicator may be defined for a class of NB-IoT devices that are unpageable. Different UE category indicators may be defined for NB-IoT devices that are pageable. Alternatively or additionally, a UE capability signalling message may include at least one pageability indicator bit which indicates whether the UE is pageable or which may indicate that the UE is unpageable.

Figure 3:
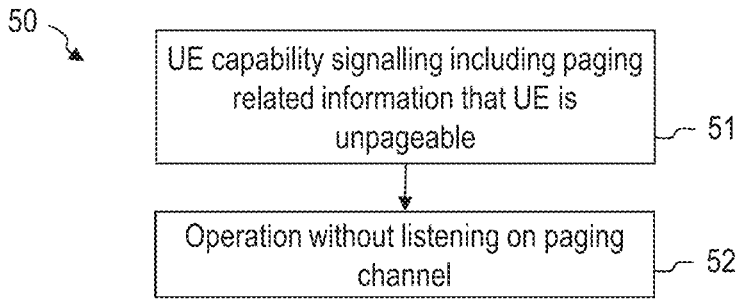
FIG. 3 is a flowchart of a method according to an embodiment.

FIG. 3 is a flowchart of a method 50 according to an embodiment. The method 50 may be performed by a UE 10 according to an embodiment.

At 51, the UE may transmit a UE capability signalling message that includes paging related information indicating that the UE is unpageable.

At 52, the UE may operate without listening for pages. The radio interface unit 11 may be controlled such that the UE does not listen on the paging channel. Power consumption may be reduced thereby.

In order to receive downlink traffic, the UE may initiate MO traffic or may perform a TAU procedure. The cellular network, e.g. a MME 41, may wait for the UE to initiate MO traffic or perform a TAU procedure until downlink data is piggybacking on to the signals transmitted to the UE.

The time intervals between successive periods in which the UE may receive downlink transmissions may be much longer than the time interval between successive intervals in which the UE performs uplink data transmission.

Figure 4:
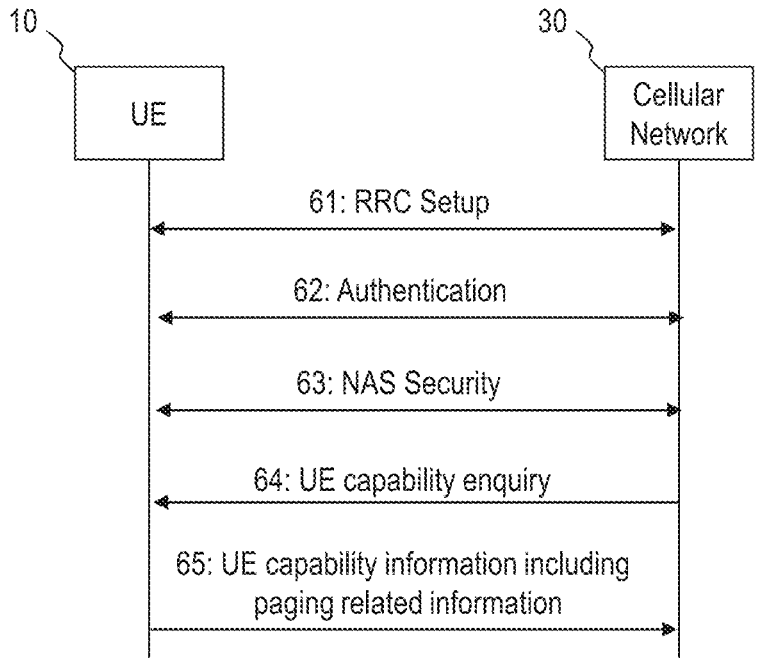
FIG. 4 is a signalling diagram in a communication system according to an embodiment.

FIG. 4 is a signalling diagram that illustrates UE capability signalling to indicate that the UE is unpageable.

The UE and cellular network may perform an RRC setup 61. The UE and cellular network may execute authentication procedures 62. The UE and cellular network may perform NAS security procedures 63.

The cellular network 30 may transmit a UE capability enquiry 64 on to the UE 10.

In response to receiving the UE capability enquiry 64, the UE may transmit a UE capability signalling message 65 that includes information that the UE 10 is unpageable.

In continued operation of the UE, the UE will never listen for pages from the cellular network.

Figure 5:
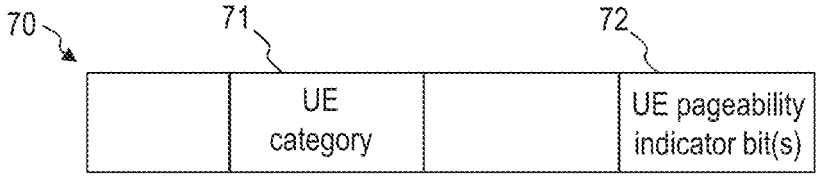
FIG. 5 illustrates UE capability signalling that includes pageability information transmitted by the UE according to an embodiment.

FIG. 5 shows a UE capability signalling message 70 that may be transmitted by the UE 10 according to an embodiment. The UE capability signalling message 70 may include at least one and preferably several UE category indicator bits 71. The UE capability signalling message 70 includes one or several UE pageability indicator bit(s) 72. The UE pageability indicator bit(s) 72 may be set to a first value that indicates that the UE is unpageable. In response to receiving a UE pageability signalling message 70 in which the UE pageability indicator bit(s) 72 are set to a first value that indicates that the UE is unpageable, the cellular network may stop paging the UE 10 or may refrain from ever starting paging.

The UE pageability indicator bit(s) 72 may be set to a second value that indicates that the UE is pageable. In response to receiving a UE pageability signalling message 70 in which the UE pageability indicator bit(s) 72 are set to a second value that indicates that the UE is pageable, the cellular network may page the UE 10 in any one of a variety of techniques. Those techniques may include techniques in which the cellular network decides to restrict paging of the UE 10, which then in turn causes the UE 10 to refrain from listening for pages even when the UE 10 is pageable.

For illustration, the MME of the cellular network may page the UE 10 according to a conventional DRX scheme or an extended DRX (eDRX) scheme.

The cellular network may also inform the UE 10, even when the UE 10 is pageable, that the cellular network does not intend to page the UE 10 or that other paging restrictions will apply. For example, the cellular network may inform the UE 10 that the cellular network will not page the UE 10. In response to receipt of such information from the cellular network, the UE 10 may terminate listening for pages. Paging restrictions may be invoked by the cellular network when the UE 10 operates in EC mode, for example, or is an MTC device.

Figure 6:
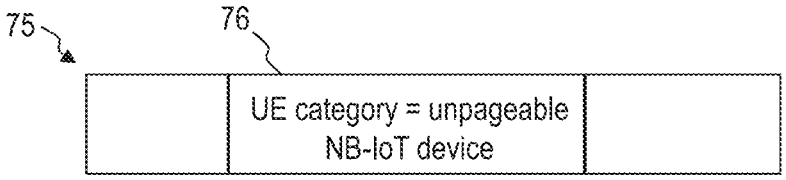
FIG. 6 illustrates UE capability signalling that includes pageability information transmitted by the UE according to an embodiment.

FIG. 6 shows a UE capability signalling message 75 that may be transmitted by the UE 10 according to an embodiment. The UE capability signalling message 75 may include several UE category indicator bits 76. The UE category indicator bits 76 may be set to a first value that indicates that the UE is an unpageable NB-IoT device. In response to receiving a UE pageability signalling message 75 in which the UE category indicator bits 76 may be set to a first value that indicates that the UE is an unpageable NB-IoT device, the cellular network may stop paging the UE 10 or may refrain from ever starting paging the UE 10.

The UE category indicator bits 76 may be set to a second value that indicates that the UE is a pageable NB-IoT device. In response to receiving a UE pageability signalling message 76 in which the UE category indicator bits 76 are set to a second value that indicates that the UE is a pageable NB-IoT device, the cellular network may page the UE 10 in any one of a variety of techniques as described with reference to FIG. 5 above.

Figure 7:
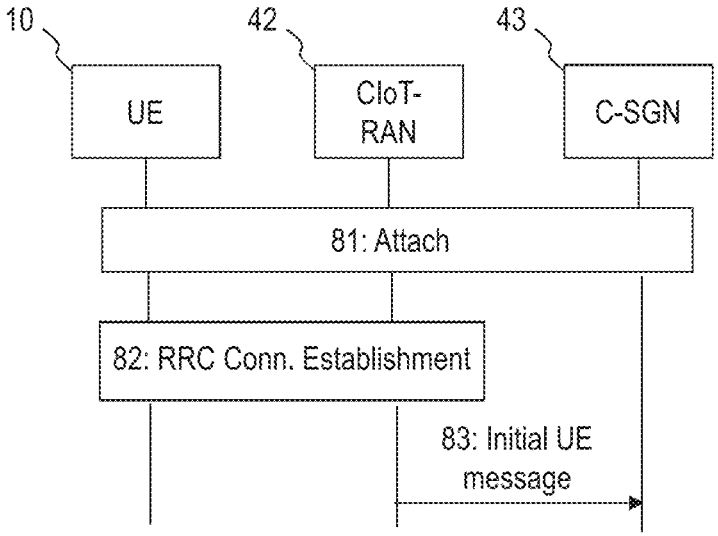
FIG. 7 is a signalling diagram in a communication system according to an embodiment.

FIG. 7 is a signalling diagram which illustrates operation of a UE that is an unpageable NB-IoT device.

An attach procedure 81 is carried out for the user equipment to attach to the CIoT network. NAS signalling may be performed in the attach procedure 81, e.g. to inform the cellular network of UE pageability. In the attach procedure the amount of UL data may be announced e.g. using a buffer status report, BSR. The CIoT may grant the UE UL resources to complete step 82 and 83, for illustration if the BSR indicates a buffer level exceeding a threshold. After RRC connection establishment 82, an initial UE message 83 may be transmitted. The message 83 may include encryption data and, optionally, information on whether an acknowledgement is required. The message 83 may include a NAS PDU user data transmission as part of the RRC connection establishment in step 82.

The UE which is a NB-IoT device may transmit pageability information in the attach procedure 81 or during the RRC connection establishment 82. This may be done if the UE would like to change its pageability without performing a TAU. Normal capability signalling may be done at initial attach/network registration. Some UE parameters may be updated with TAU procedures.

It will be appreciated that a UE which is an unpageable NB-IoT device may have reduced signalling before data transmission, which reduces the number of messages that need to be sent or received by the user equipment before the user data can be transmitted or received compared to eMTC or legacy LTE procedures, reduces the complexity and the associated power consumption of the user equipment. Due to the fact that the unpageable NB-IoT device does not need to listen for pages, power consumption may be reduced further.

In addition or as an alternative to UE capability signalling that indicates that the UE is unpageable, the cellular network may also inform the UE that the cellular network will not page the UE. In response to such a signalling message or broadcast message, the UE may stop listening on a paging channel or may refrain from ever starting listening for pages.

Figure 8:
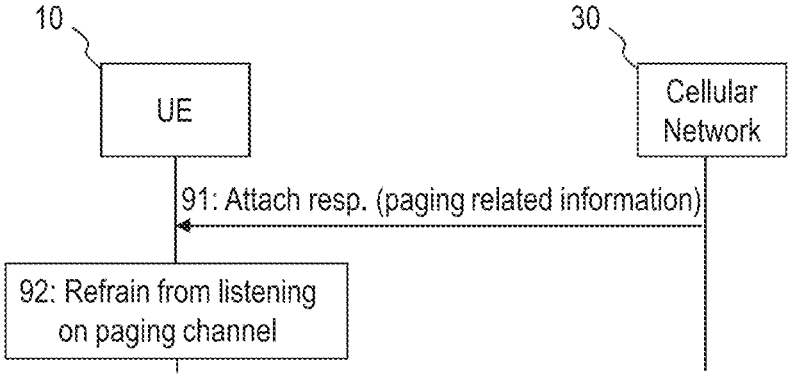
FIG. 8 is a signalling diagram in a communication system according to an embodiment.

FIG. 8 is a signalling diagram in a communication system according to an embodiment. The UE 10 may receive an attach response 91 from the cellular network. The attach response 91 may include paging related information that indicates that the cellular network will not page the UE 10. Alternatively, the paging related information may indicate that other paging restrictions apply. In response to receiving the attach response 91, the UE 10 will refrain from listening on a paging channel at 92. During ongoing operation of the UE 10, the UE 10 may be operative such that the UE 10 does not listen for pages from the cellular network.

Figure 9:
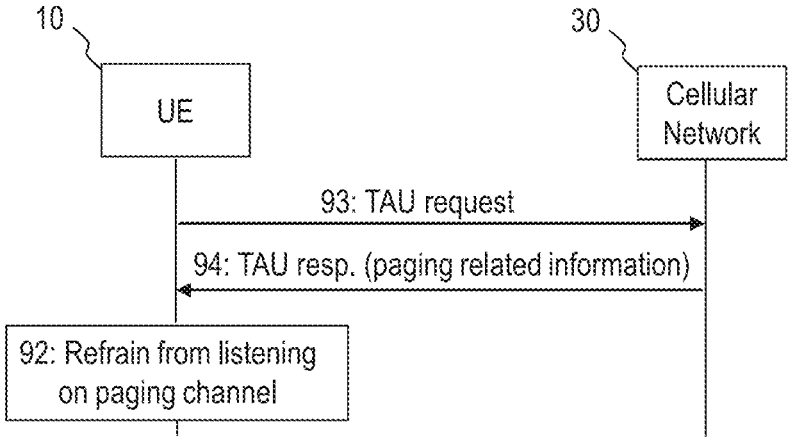
FIG. 9 is a signalling diagram in a communication system according to an embodiment.

FIG. 9 is a signalling diagram in a communication system according to an embodiment. The UE 10 may transmit a TAU request 93. The UE 10 may receive a TAU response 94. The TAU response 94 may include paging related information that indicates that the cellular network will not page the UE 10. Alternatively, the paging related information may indicate that other paging restrictions apply. In response to receiving the TAU response 94, the UE 10 will refrain from listening on a paging channel at 92. During ongoing operation of the UE 10, the UE 10 may be operative such that the UE 10 does not listen for pages from the cellular network.

Figure 10:
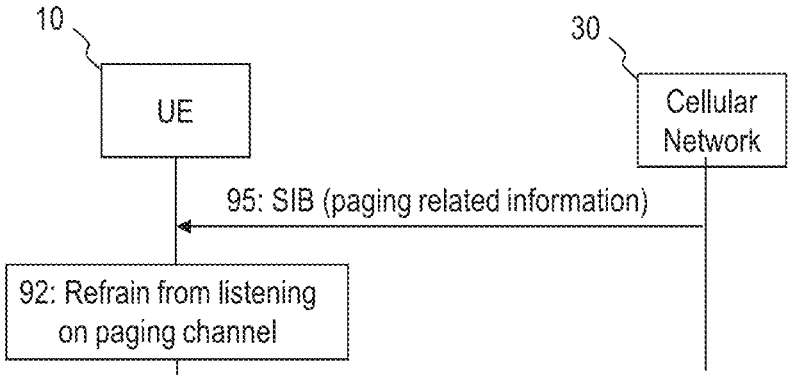
FIG. 10 is a signalling diagram in a communication system according to an embodiment.

FIG. 10 is a signalling diagram in a communication system according to an embodiment. The UE 10 may receive system information 95. The system information 95 may include one or several system information blocks. The system information 95 may include paging related information that indicates that the cellular network will not page the UE 10 or that the cellular network will not page any UE having certain UE class(es) to which the UE 10 belongs. Alternatively, the paging related information may indicate that other paging restrictions apply. In response to receiving the system information 95, the UE 10 will refrain from listening on a paging channel at 92. During ongoing operation of the UE 10, the UE 10 may be operative such that the UE 10 does not listen for pages from the cellular network.

Figure 11:
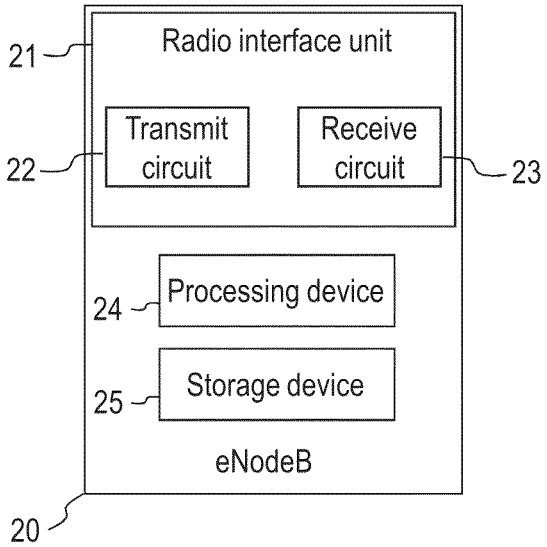
FIG. 11 is a block diagram of a base station according to an embodiment.

FIG. 11 is a functional block diagram of a base station 20 according to an embodiment. The base station 20 may be an eNodeB. The base station 20 may have a first core network interface for coupling to a first core network 30. The base station 20 may have a second core network interface for coupling to a second core network 40 which may be a CIoT CN.

The base station 20 has at least one radio interface unit 21. The at least one radio interface unit 21 includes a transmit circuit 22 and a receive circuit 23.

The base station 20 includes a processing device 24 operative coupled to the at least one radio interface unit 21 to control the at least one radio interface unit 21. The base station 20 may be operative such that, in response to receipt of a capability signalling message from the UE 10 that indicates that the UE 10 is unpageable, the UE 10 will not receive any pages. There transmit circuit 22 of the radio interface unit 21 may be controlled such that no pages are transmitted for the UE 10 that is unpageable.

The base station 20 may be operative such that the processing device 24 causes downlink data directed to an unpageable UE 10 to be buffered in a storage device 25. The downlink data may be transmitted on to the unpageable UE 10 only when the unpageable UE 10 initiates MO traffic or performs a TAU procedure. While the base station 20 may store the downlink data directed to the unpageable UE 10 in the base station 20, the downlink data may also be stored in other cellular network nodes such as the MME 41.

It will be appreciated that with massive deployment of sensors or wearable devices that mainly or intended to report measurement results to a cellular network, there is an increasing number of UEs that can accommodate long latency for downlink transmissions. NB-IoT devices or eMTC devices are exemplary for UEs that can accommodate long latency for downlink transmissions and that may therefore not need to be paged.

The processing device 24 may also be operative to control the transmit circuit 22 such as to inform a pageable UE 19 that the cellular network does not intend to page the UE 19. The processing device 24 may control the transmit circuit 22 to transmit information indicating that the cellular network does not intend to page the UE 19 over the RAN.

The base station 20 may be operative such that, after informing the UE 19 that indicates that cellular network will not page the UE 19, the UE 19 will not receive any pages. The transmit circuit 22 of the radio interface unit 21 may be controlled such that no pages are transmitted for the UE 19 which is not to be paged.

The base station 20 may be operative such that the processing device 24 causes downlink data directed to a UE 19 that will not be paged to be buffered in the storage device 25. The downlink data may be transmitted on to the UE 19 that will not be paged only when the UE 19 initiates MO traffic or performs a TAU procedure. While the base station 20 may store the downlink data directed to the UE 19 in the base station 20, the downlink data may also be stored in other cellular network nodes such as the MME 41 or serving gateway (SGW) or PDN gateway (PGW) or SMS server.

While a base station 20 has been explained with reference to FIG. 11, it will be appreciated that other cellular network nodes, including core network nodes, may be operative to determine whether a UE is to be paged. For illustration, an MME in the CN may be operative to evaluate pageability information provided by a UE to the cellular network. The MME may refrain from paging the UE if the pageability information indicates that the UE is unpageable.

Other paging restrictions may alternatively or additionally be used. For illustration, only one paging attempt may be performed by the cellular network. The cellular network may use information about a last known coverage extension (CE) level and cell in the one paging attempt. If the UE does not respond to the one page attempt, the cellular network will wait for the UE to initiate MO traffic or conduct a TAU procedure. The MME could then piggy back its information.

For UEs operating in EC mode, the base station 20 may selectively determine whether the cellular network will refrain from paging the respective UE or whether only one paging attempt will be used.

Figure 12:
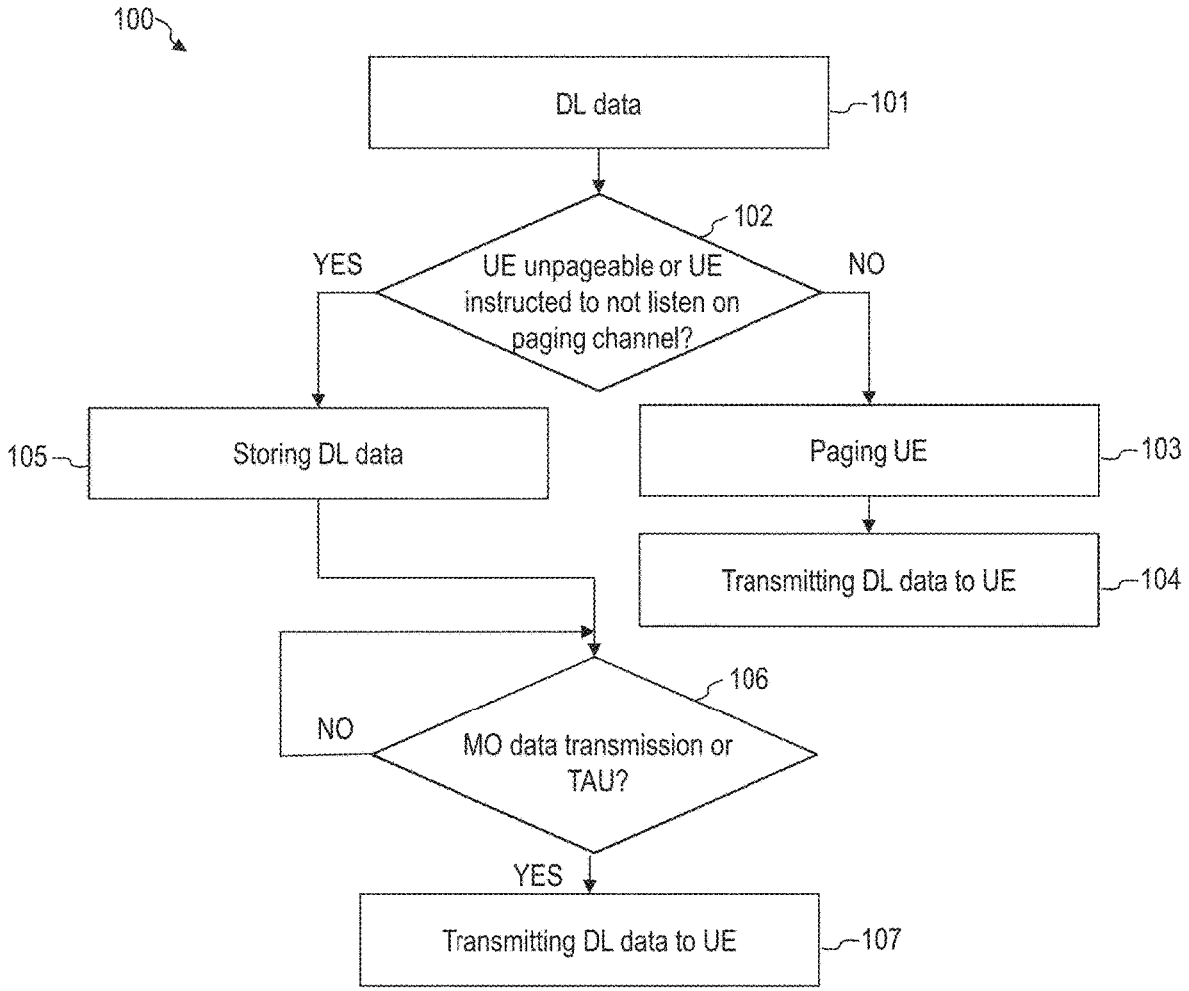
FIG. 12 is a flowchart of a method according to an embodiment.

FIG. 12 is a flowchart of a method 100 according to an embodiment. The method 100 may be performed by a base station 20 or a cellular network node, such as an MME 41.

At 101, downlink (DL) data is to be transmitted to a UE.

At 102, it is determined whether the UE is unpageable or whether the UE was otherwise instructed to not listen for pages on the paging channel. If the UE is pageable and if the UE was not informed that the cellular network will refrain from paging the UE, the method proceeds to 103.

At 103, the cellular network pages the UE. At 104, the DL data is transmitted to the UE.

At 105, if it is determined that the UE is unpageable or that the UE was informed that the cellular network will refrain from paging the UE, the DL data may be stored. The DL data may be stored selectively, depending on the data. The DL data may be stored in a storage device of the base station 20 or of another cellular network node.

At 106, it is determined whether the UE initiates a MO data transmission or performs a TAU procedure. The base station 20 or other cellular network node may continue the monitoring at step 106 until after the UE has initiated a MO data transmission or performed a TAU procedure.

At 107, after the UE has initiated a MO data transmission or performed a TAU procedure, the DL data will be transmitted to the UE. The DL data transmission may be piggy backed on a TAU procedure or MO traffic utilizing the available RRC connection.

Paging restrictions may be employed selectively if a UE operates in EC mode or if a UE is a NB-IoT device. This will be explained in more detail with reference to FIG. 13.

Figure 13:
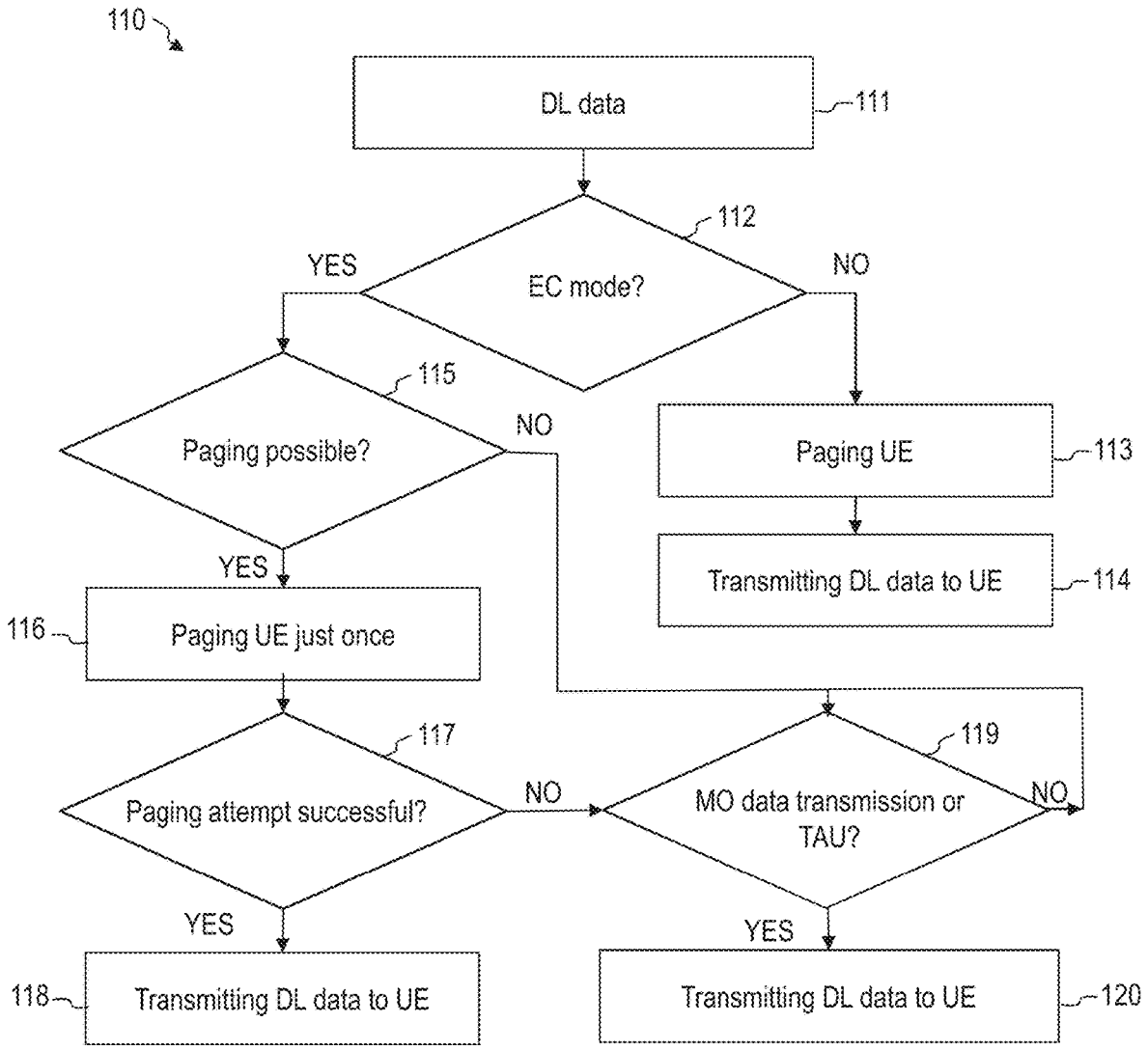
FIG. 13 is a flowchart of a method according to an embodiment.

FIG. 13 is a flowchart of a method 110 according to an embodiment. The method 110 may be performed by a base station 20 or a cellular network node, such as an MME 41.

At 111, downlink (DL) data is to be transmitted to a UE.

At 112, it is determined whether the UE to which the DL data is to be transmitted operates in EC mode. If the UE does not operate in EC mode, the method proceeds to steps 113 and 114. At 113, the cellular network pages the UE. At 114, the DL data is transmitted to the UE.

At 115, if it was determined at step 112 that the UE is in EC mode, it is determined whether the UE can be paged. This may be implemented using decision logic as explained with reference to step 102 of FIG. 12, for example. Determining whether the UE can be paged may involve determining whether the UE has indicated in capability signalling that the UE is an unpageable NB-IoT device and whether the cellular network has indicated that it does not intend to page the UE.

If it is determined that the UE can be paged, the method may proceed to 116.

At 116, the UE operating in EC mode may be paged just once. The base station may use information about the last known CE level and cell when making the just one paging attempt.

At 117, it is determined whether the paging attempt is successful. If the paging attempt has been successful, the method proceeds to 118 and the DL data is transmitted to the UE.

At 119, if the UE cannot be paged or if the paging attempt at 116 was unsuccessful, it is determined whether the UE initiates a MO data transmission or performs a TAU procedure. The base station 20 or other cellular network node may continue the monitoring at step 119 until the UE has initiated a MO data transmission or performed a TAU procedure. The network may store the data, if required or possible, until the data may be transmitted to the UE.

At 120, after the UE has initiated a MO data transmission or performed a TAU procedure, the DL data will be transmitted to the UE. The DL data transmission may be piggy backed on a TAU procedure or MO traffic utilizing the available RRC connection.

The paging restrictions which cause the UE to refrain from listening for pages or which limit paging to just one paging attempt may be employed when the coverage of a cell is to be extended, for example for EC mode in which transmissions are repeated several times are for NB-IoT operation. The extension of coverage is illustrated in FIG. 14.

Figure 14:
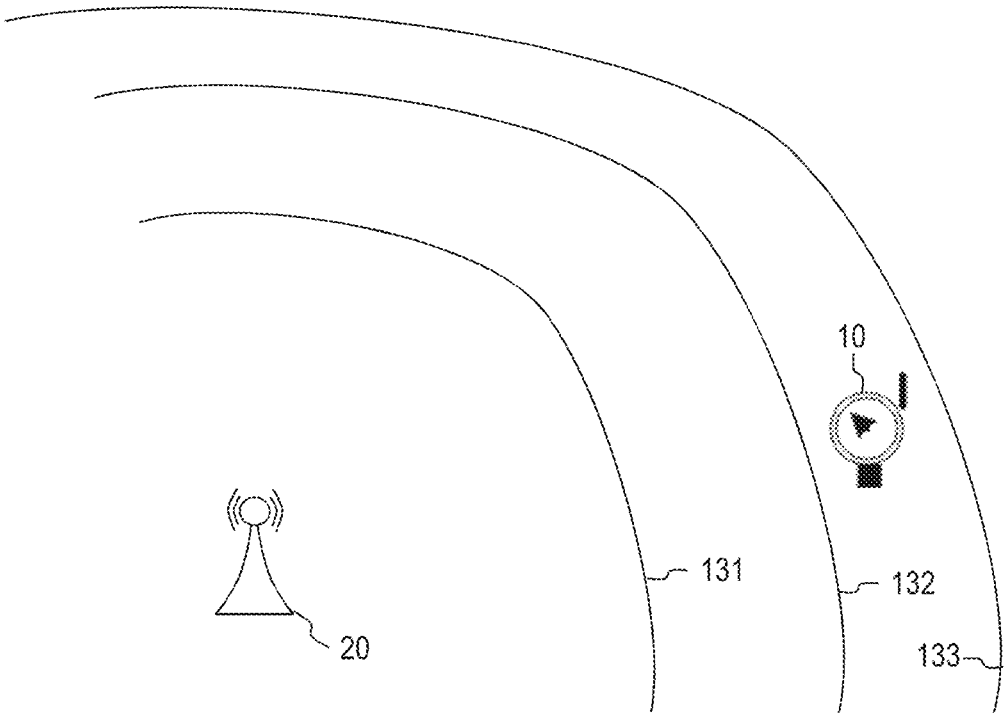
FIG. 14 illustrates deployment scenarios of devices according to embodiments.

FIG. 14 illustrates the extended coverage radius modes in which a user equipment may refrain from listening for pages or in which the cellular network may inform the UE that it does not intend to page the UE. The normal coverage in legacy LTE is defined by a first coverage radius 131. The eMTC device in EC mode has a second, extended coverage 132. NB-IoT that may have a certain coverage extension (CE) level may provide a third, even further extended coverage 133. It will be appreciated that an eMTC device or NB-IoT device may also be combine the different EC. A UE 10, which may be a sensor or a wearable device operative in accordance with NB-IoT, may refrain from listening for pages from the cellular network.

Various effects are attained by the devices, methods and systems according to embodiments. For illustration, user equipment battery lifetime may be prolonged. Radio access network loads may be reduced. This is attained by implementing paging restrictions in which paging is reduced even further compared to eDRX, and which causes the UE to refrain from listening for pages, for example. The paging restrictions may cause the cellular network to refrain from paging one or several UEs.

In any one of the embodiments, the paging related information may be paging configuration information that specifies a paging configuration. The paging to configuration may define whether a UE is pageable as normal, unpageable, i.e. unable to receive pages, or able to receive pages, but not listening for pages because the network will not send any page for to this device.

The paging configuration may be defined by the paging related information that is signaled between the UE and the network. The paging configuration may be transmitted from the UE to the network in capability signalling or may be transmitted from the network to the UE when the network informs the UE that it will not page the UE.

While exemplary embodiments have been described with reference to the drawings, modifications may be implemented in other embodiments. For illustration, while embodiments have been described in the context of exemplary cellular networks and radio access networks, the techniques discussed herein are applicable to a wide variety of other cellular networks. For further illustration, while exemplary operation modes and device classes have been described in which paging restrictions may apply, other modes or UE classes may also be subject to paging restrictions.

While the user equipment may be a sensor or a wearable device, the techniques discussed herein may also be used in conjunction with other user equipments.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

The invention claimed is:

1. A user equipment (UE), comprising:

a radio interface operative to*:* transmit at least one message including paging related information indicating whether the UE is pageable or unpageable*; or*

*receive paging related information indicating that a cellular network will not page the UE*, wherein the UE does not listen on a paging channel when unpageable *or when the cellular network will not page the UE*; and an electronic circuit configured to control the radio interface in dependence on the paging related information, wherein the electronic circuit is configured to control the radio interface to refrain from listening on a paging channel when the paging related information indicates the UE is unpageable *or that the cellular network will not page the UE*, wherein the UE, when unpageable *or when the cellular network will not page the UE*, is operable to receive downlink user data after the UE initiates mobile originated, MO, traffic.

2. The user equipment of claim 1, wherein the radio interface is operative to transmit the at least one message in an initial attach or initial network registration procedure.

3. The user equipment of claim 1, wherein the at least one message includes at least one of a UE category indicator or at least one pageability indicator bit that indicates whether the UE is pageable or unpageable.

4. The user equipment of claim 3, wherein the at least one message includes both the UE category indicator and the at least one pageability indicator bit, the at least one pageability indicator bit being an information element different from the UE category indicator.

5. The user equipment of claim 3, wherein the UE category indicator included in the at least one message is indicative of whether the UE is pageable.

6. The user equipment of claim 5, wherein the UE category indicator indicates that the UE is included in a class of unpageable Narrow Band Internet of Things (NB-IoT) devices.

7. The user equipment of claim 1, wherein the radio interface is further operative to receive a further message that at least one of activates or deactivates a respective mode in which the UE is pageable or unpageable until receiving a further instance of a downlink message.

8. The user equipment of claim 1, wherein the UE is configurable by a cellular network so as to be unpageable.

9. The user equipment of claim 8, wherein the UE is operative to receive a signalling message from the cellular network which causes the UE to refrain from listening for pages.

10. The user equipment of claim 1, wherein the UE that is unpageable is a UE operating in extended coverage (EC) mode; or a UE insensitive to high latency on downlink data traffic; or a Narrow Band Internet of Things (NB-IoT) device.

11. The user equipment of claim 1, wherein the UE that is unpageable is operative to receive downlink user data after the UE conducts a tracking area update (TAU) procedure.

12. A network node *of a cellular network*, comprising:

an interface operative to*:* receive, from a user equipment (UE), at least one user equipment (UE) message including paging related information indicative of whether the UE is pageable such that the UE is configured to receive pages directed to the UE, or unpageable such that the UE does not listen on a paging channel; *or*

*transmit paging related information to the UE to inform the UE that the cellular network will not page the UE;* and a processing device operative to control paging of the UE in dependence on the pageability information and to transmit downlink user data to the UE after the UE initiates mobile originated traffic.

13. The network node of claim 12, wherein the interface is operable to receive the at least one user equipment message in an initial attach or initial network registration procedure of the at least one user equipment.

14. The network node of claim 12, wherein the at least one user equipment message includes at least one of a UE category indicator or at least one pageability indicator bit that indicates whether the UE is pageable or unpageable.

15. The network node of claim 12, wherein the processing device is operative to process the at least one UE message, the at least one UE message including the paging related information that is indicative of whether the UE is pageable; or inform the UE that the UE will not be paged.

16. The network node of claim 12, wherein the processing device is operative to delay a downlink data transmission for a UE that is unpageable until after the UE conducts a tracking area update (TAU) procedure.

17. A system, comprising:

the network node of claim 12; and the user equipment, comprising:

a radio interface operative to*:* transmit *the* at least one *user equipment* (*UE*) message including paging related information indicating whether the UE is pageable or unpageable*; or receive the paging related information indicating that the cellular network will not page the UE*, wherein the UE does not listen on a paging channel when unpageable *or when the cellular network will not page the UE*; and an electronic circuit configured to control the radio interface in dependence on the paging related information, wherein the electronic circuit is configured to control the radio interface to refrain from listening on a paging channel when the paging related information indicates the UE is unpageable *or when the cellular network will not page the UE*.

18. The system of claim 17, wherein the radio interface of the user equipment is operative to transmit the at least one *user equipment* (*UE*) message in an initial attach or initial network registration procedure.

19. A method of conducting radio communication between a user equipment (UE) and a cellular network, the method comprising:

transmitting, from the UE, at least one message including paging related information indicating whether the UE is pageable or unpageable, *or receiving, by the UE, paging related information indicating that a cellular network will not page the UE,* wherein the UE does not listen on a paging channel when unpageable *or when the cellular network will not page the UE*; and operating a radio interface, based [respectively] on [whether the UE is pageable or unpageable] *the paging related information*, to [listen on a paging channel or] not listen on the paging channel *when the paging related information indicates the UE is unpageable or that the cellular network will not page the UE*, wherein the UE, when unpageable *or when the cellular network will not page the UE*, is operable to receive downlink user data after the UE initiates mobile originated traffic.

* * * * *